United States Patent
Razzetti et al.

(10) Patent No.: US 11,082,266 B2
(45) Date of Patent: Aug. 3, 2021

(54) PROBABILISTIC AMPLITUDE SHAPING

(71) Applicant: Nokia Solutions and Networks Oy, Espoo (FI)

(72) Inventors: Luca Gabriele Razzetti, Sesto san Giovanni (IT); Giancarlo Gavioli, Arcore (IT); Carlo Costantini, Casatenovo (IT); Sara Caobianco, Cavenago d'Adda (IT)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 16/808,433

(22) Filed: Mar. 4, 2020

(65) Prior Publication Data
US 2020/0287756 A1 Sep. 10, 2020

(30) Foreign Application Priority Data
Mar. 8, 2019 (EP) ...................................... 19161771

(51) Int. Cl.
*H04L 25/03* (2006.01)
*H04L 27/36* (2006.01)
(52) U.S. Cl.
CPC ........ *H04L 25/03828* (2013.01); *H04L 27/36* (2013.01); *H04L 2025/03675* (2013.01)
(58) Field of Classification Search
CPC .......................... H04L 27/3405; H04L 27/3411
See application file for complete search history.

(56) References Cited

U.S. PATENT DOCUMENTS

| 10,069,519 | B1 | 9/2018 | Millar et al. |
| 10,091,046 | B1 | 10/2018 | Lefevre |
| 2018/0026725 | A1 | 1/2018 | Cho |
| 2018/0367246 | A1* | 12/2018 | Kakande ............... H04L 1/0042 |

OTHER PUBLICATIONS

Böcherer et al., "Bandwidth Efficient and Rate-Matched Low-Density Parity-Check Coded Modulation", IEEE Transactions on Communications, vol. 63, No. 12, Dec. 2015, pp. 4651-4665.
Forney et al., "Efficient Modulation for Band-Limited Channels", IEEE Journal on Selected Areas in Communications, vol. SAC-2, No. 5, Sep. 1984, pp. 632-647.
Schulte et al., "Constant Composition Distribution Matching", IEEE Transactions on Information Theory, vol. 62, No. 1, Jan. 2016, pp. 430-434.

(Continued)

*Primary Examiner* — Kevin Kim
(74) *Attorney, Agent, or Firm* — Mendelsohn Dunleavy, P.C.; Yuri Gruzdkov

(57) ABSTRACT

An apparatus, comprising: circuitry configured, in response to receipt of input data, to transmit a stream of symbols of a constellation to a modulator for modulation onto a carrier wherein a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols.

16 Claims, 6 Drawing Sheets

(56) References Cited

OTHER PUBLICATIONS

Buchali et al., "Rate Adaptation and Reach Increase by Probabilistically Shaped 64-QAM: An Experimental Demonstration", Journal of Lightwave Technology, vol. 34, No. 7, Apr. 1, 2016, pp. 1599-1609.

Savory et al., "Electronic Compensation of Chromatic Dispersion using a Digital Coherent Receiver", Optics Express, vol. 15, No. 5, 2007, 7 pages.

Tehrani et al., "A Novel Nonlinearity Tolerant Super-Gaussian Distribution for Probabilistically Shaped Modulation", European Conference on Optical Communication (ECOC), Sep. 23-27, 2018, 3 pages.

Godard, "Self-Recovering Equalization and Carrier Tracking in Two-Dimensional Data Communication Systems", IEEE Transactions on Communications, vol. 28, No. 11, Nov. 1980, pp. 1867-1875.

Laroia et al., "On Optimal Shaping of Multidimensional Constellations", IEEE Transactions on Information Theory, vol. 40, No. 4, Jul. 1994, pp. 1044-1056.

Series V: Data Communication Over the Telephone Network, Interfaces and voiceband modems,"A Modem Operating at Data Signalling Rates of up to 33 600 bit/s for use on the General Switched Telephone Network and on Leased Point-to-Point 2-Wire Telephone-Type Circuits", ITU-T Recommendation V.34, Feb. 1998, 79 pages.

Böcherer et al., "High Throughput Probabilistic Shaping with Product Distribution Matching", arXiv:1702.07510v1 [cs.IT], Feb. 24, 2017, pp. 1-9.

Koike-Akino et al., "Lattice Precoding for Multi-Span Constellation Shaping", European Conference on Optical Communication (ECOC), Sep. 23-27, 2018, 3 pages.

Sheikh et al., "Probabilistic Amplitude Shaping with Hard Decision Decoding and Staircase Codes", Journal of Lightwave Technology, vol. 36, No. 9, May 1, 2018, pp. 1689-1697.

Fehenberger et al., "Multiset-Partition Distribution Matching", arXiv, Aug. 9, 2018, pp. 1-9.

Partial European Search Report received for corresponding European Patent Application No. 19161771.1, dated Sep. 12, 2019, 16 pages.

Rosiers et al., "Effect of Varying Source Kurtosis on the Multimodulus Algorithm", IEEE International Conference on Communications (Cat. No. 99CH36311), Jun. 6-10, 1999, pp. 1300-1304.

Extended European Search Report received for corresponding European Patent Application No. 19161771.1, dated Jan. 3, 2020, 16 pages.

* cited by examiner

PROBABILISTIC AMPLITUDE SHAPING

CROSS-REFERENCE TO RELATED APPLICATION

This application claims the benefit of European patent application No. 19161771.1 filed on Mar. 8, 2019, titled "PROBABILISTIC AMPLITUDE SHAPING", the content of which is incorporated herein by reference in its entirety.

TECHNOLOGICAL FIELD

Embodiments of the present disclosure relate to Probabilistic Amplitude Shaping. Some relate to Probabilistic Amplitude Shaping configured for blind equalization at a receiver.

BACKGROUND

The capacity of an Additive White Gaussian Noise (AWGN) channel can be modeled by the Shannon-Hartley theorem:

$$C = B \cdot \log_2(1 + S/N)$$

where
C is the maximum capacity, Shannon's capacity limit, in bits/s
B is bandwidth in Hz
S is signal power in W
N is Additive White Gaussian Noise in W.
The ratio S/N is the signal to noise ratio.

Shannon's capacity limit is approached when a stream of symbols of a constellation, having undergone Probabilistic Amplitude Shaping, are transmitted to a modulator for modulation onto a carrier. In Probabilistic Amplitude Shaping, a frequency of occurrence of symbols in the stream is dependent upon a probability-amplitude distribution for symbols of the constellation. The probability-amplitude distribution is or is close to a Gaussian distribution to maximize capacity. The shape of the probability-amplitude distribution causes low-amplitude symbols to occur more frequently on average in the stream than high-amplitude symbols. At high signal to noise ratios, a significant gain can be achieved by shaping of the probability-amplitude distribution compared to equally probable amplitudes.

BRIEF SUMMARY

According to various, but not necessarily all, embodiments there is provided an apparatus, comprising
circuitry configured, in response to receipt of input data, to transmit a stream of symbols of a constellation to a modulator for modulation onto a carrier wherein
a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols.

In some but not necessarily all examples, for increasing data rates for the input data, the transmitted stream of symbols of the constellation has a probability-amplitude distribution with a constant or increasing kurtosis.

In some but not necessarily all examples, the target value for 64QAM is 1.8.

In some but not necessarily all examples, the target value is a programmable target value.

In some but not necessarily all examples, the probability-amplitude distribution is kurtosis-constrained having a kurtosis conditioned for blind equalization.

In some but not necessarily all examples, the circuitry comprises:
a probabilistic amplitude shaping symbol source circuit configured, in response to receipt of the input data, to produce the first stream of symbols of the constellation for modulation wherein a frequency of occurrence of symbols in the first stream is dependent upon a probability-amplitude distribution for symbols of the constellation, wherein the probability-amplitude distribution is a probability-amplitude distribution that causes low-amplitude symbols to occur more frequently on average in the stream than high-amplitude symbols; and
a constellation re-mapper circuit configured, in response to receipt of the first stream of symbols, to map the first stream of symbols to the second stream of symbols of the constellation for modulation and to produce the second stream of symbols wherein the second stream of symbols has a lower kurtosis than the first stream of symbols.

In some but not necessarily all examples, the constellation re-mapper circuit is configured, in response to receipt of the first stream of symbols, to map each non-overlapping group of N symbols of the first stream of symbols to a non-overlapping group of N symbols of the second stream of symbols of the constellation for modulation, wherein N is greater than or equal to 2.

In some but not necessarily all examples, the constellation re-mapper circuit is configured to control statistics of the symbol groups rather than independently setting statistics of each symbol.

In some but not necessarily all examples, the constellation re-mapper circuit comprises one or more look-up tables to map the first stream of symbols to the second stream of symbols of the constellation for modulation.

In some but not necessarily all examples, the probabilistic amplitude shaping symbol source circuit is configured to separately define each bit of a symbol, for the first stream of symbols, that encodes an amplitude of the symbol, each binary bit permutation having a different probability.

In some but not necessarily all examples, the probabilistic amplitude shaping symbol circuit is configured to perform probabilistic amplitude shaping independently for different polarization and/or for different real and imaginary symbols and/or for different odd and even symbols.

In some but not necessarily all examples, the probabilistic amplitude shaping symbol circuit is configured to separate orthogonal amplitude values from a modulation symbol, to perform probabilistic amplitude shaping independently on each orthogonal amplitude value to create
orthogonal probabilistic amplitude shaped amplitude values, and to recombine the orthogonal probabilistic amplitude shaped amplitude values to create a probabilistic amplitude shaped modulation symbol.

In some but not necessarily all examples, the apparatus is embodied in one or more application specific circuits.

According to various, but not necessarily all, embodiments there is provided an optical communication system comprising:
a transmitter comprising the apparatus as claimed in any preceding claim, wherein the transmitter is configured to transmit the carrier onto which the stream of symbols of the constellation has been modulated; and a receiver comprising an circuitry configured, in response to receipt of the carrier, to demodulate the carrier to obtain the stream of symbols of the constellation and use the probability-amplitude distribution for symbols of the constellation to obtain an estimate of the input data wherein the receiver comprises:

means for performing blind equalization to produce a stream of signals an inverse constellation re-mapper configured, in response to receipt of the stream of symbols of a constellation, to map the stream of symbols to a different stream of symbols of the constellation wherein the different stream of symbols has a higher kurtosis than the stream of symbols.

According to various, but not necessarily all, embodiments there is provided a method of programming the apparatus comprising:

performing constrained optimization to create a multiple input symbol to multiple output symbol mapping for symbols of a constellation, wherein the output symbols have a probability-amplitude distribution that maximizes channel capacity while constraining symbol kurtosis below a target value; and encoding a look-up table in the apparatus with the mapping.

According to various, but not necessarily all, embodiments there is provided an apparatus, comprising a probabilistic amplitude shaping symbol source configured, in response to receipt of input data, to produce a first stream of symbols of a constellation for modulation wherein a frequency of occurrence of symbols in the first stream is dependent upon a probability-amplitude distribution for symbols of the constellation, wherein the probability-amplitude distribution is a probability-amplitude distribution that causes low-amplitude symbols to occur more frequently on average in the stream than high-amplitude symbols;

a constellation re-mapper configured, in response to receipt of the first stream of symbols, to map the first stream of symbols to a second stream of symbols of the constellation for modulation and to produce the second stream of symbols wherein the second stream of symbols has a lower kurtosis than the first stream of symbols.

According to various, but not necessarily all, embodiments there is provided an apparatus, comprising a constellation mapper configured, in response to receipt of input data, to transmit a stream of symbols of a constellation to a modulator for modulation onto a carrier wherein a frequency of occurrence of symbols in the stream is dependent upon a probability-amplitude distribution for symbols of the constellation, wherein the probability-amplitude distribution is kurtosis-constrained having a kurtosis conditioned for blind equalization and a shape of the probability-amplitude distribution causes low-amplitude symbols to occur more frequently on average in the stream than high-amplitude symbols.

According to various, but not necessarily all, embodiments there is provided an apparatus, comprising circuitry configured, in response to receipt of input data at a first data rate, to transmit a stream of symbols of a constellation to a modulator for modulation onto a carrier wherein a frequency of occurrence of symbols in the stream is dependent upon a first probability-amplitude distribution for symbols of the constellation, wherein the first probability-amplitude distribution has a first kurtosis and a shape of the first probability-amplitude distribution causes low-amplitude symbols to occur more frequently on average in the stream than high-amplitude symbols;

configured, in response to receipt of input data at a second data rate, higher than the first data rate, to transmit a stream of symbols of a constellation to a modulator for modulation onto a carrier wherein a frequency of occurrence of symbols in the stream is dependent upon a second, different probability-amplitude distribution for symbols of the constellation, wherein the second probability-amplitude distribution has a second, different kurtosis that is less than the first kurtosis and a shape of the second probability-amplitude distribution causes low-amplitude symbols to occur more frequently on average in the stream than high-amplitude symbols; and configured, in response to receipt of input data at a third data rate, higher than the second data rate, to transmit a stream of symbols of a constellation to a modulator for modulation onto a carrier wherein a frequency of occurrence of symbols in the stream is dependent upon a third, different probability-amplitude distribution for symbols of the constellation, wherein the third probability-amplitude distribution has a third, different kurtosis that is less than the first kurtosis and greater then the second kurtosis and a shape of the second probability-amplitude distribution causes low-amplitude symbols to occur more frequently on average in the stream than high-amplitude symbols.

According to various, but not necessarily all, embodiments there is provided a method comprising causing probabilistic amplitude shaping by mapping an input data stream to a first stream of symbols of a constellation such that the first stream has symbols of lower energy that are more probable than other symbols; and re-mapping the first stream of symbols to produce a second stream of symbols of the same constellation such that the second stream has a probability distribution of the symbols that is of lower kurtosis than a probability distribution of the first stream.

According to various, but not necessarily all, embodiments there is provided an apparatus, comprising a digital mapper to cause probabilistic amplitude shaping by mapping an input data stream to a first stream of symbols of a constellation such that the first stream has symbols of lower energy are more probable than other symbols in response to the input data stream being random or pseudorandom; and a digital re-mapper to map the first stream of symbols into a second stream of symbols of the same constellation such that the second stream has a probability distribution of the symbols of lower kurtosis than the first stream in response to the input data stream being random or pseudorandom According to various, but not necessarily all, embodiments there is provided a method comprising producing a first stream of symbols of a constellation for modulation wherein a frequency of occurrence of symbols in the first stream is dependent upon a probability-amplitude distribution for symbols of the constellation, wherein the probability-amplitude distribution is a probability-amplitude distribution that causes low-amplitude symbols to occur more frequently on average in the stream than high-amplitude symbols;

re-mapping the first stream of symbols to a second stream of symbols of the constellation for modulation and to produce the second stream of symbols wherein the second stream of symbols has a lower kurtosis than the first stream of symbols.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
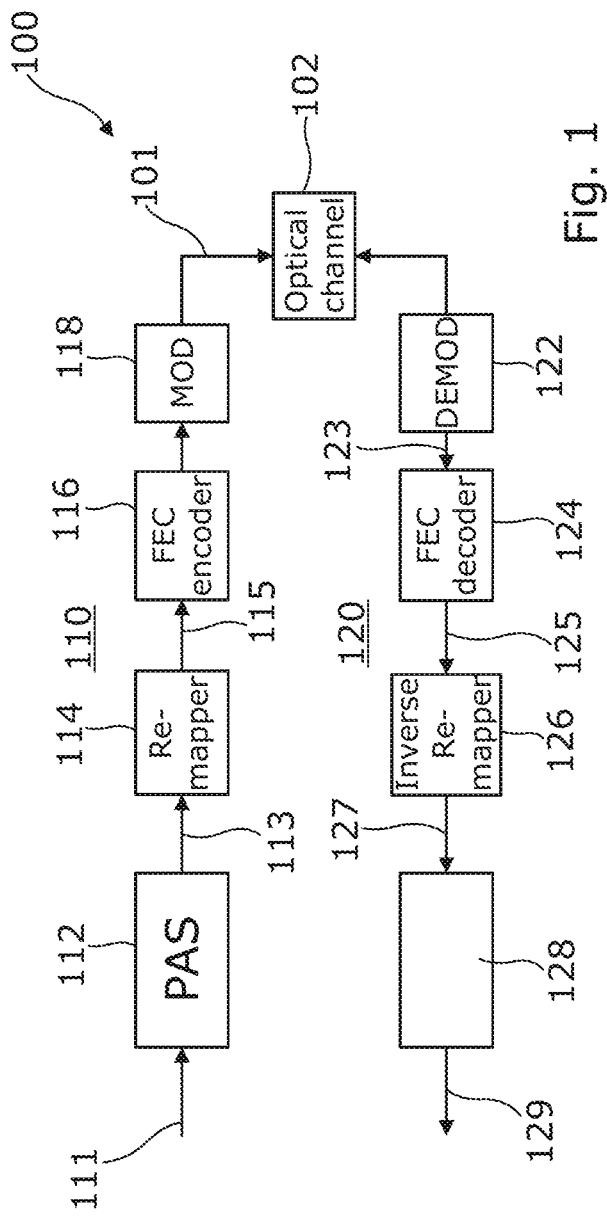
FIG. 1 shows an example embodiment of the subject matter described herein.

FIG. 1. illustrates an example of a communication system 100. In this example, the system 100 is an optical communication system. In some, but not necessarily all, examples, it is a high speed coherent optical communication system. In this context high speed means an information rate of >100 Gb/s or, in some circumstances, >1 Tb/s.

A transmitter 110 is configured to transmit a modulated carrier signal 101 through an optical channel 102 to a receiver 120. A stream of symbols has been modulated onto a carrier signal by a modulator 118 to form the modulated carrier signal 101.

In this example, quadrature amplitude modulation is used to modulate the carrier signal. In quadrature amplitude modulation (QAM), an ordered group of N binary bits is converted to a unique combination of phase shift and amplitude. This unique combination can be represented as a point (X, Y) in an Argand diagram. A constellation diagram is an Argand diagram that represents the location, that is the constellation point (X, Y) of each modulation symbol. The set of M symbols for a given modulation is a modulation alphabet, where $M=2^N$. A particular alphabet M is used for M-QAM modulation and this defines a constellation of M distinct points each of which represents a symbol. The modulator 118 modulates a stream of symbols of the constellation onto the carrier signal.

The transmitter 110 comprises a probabilistic amplitude shaping (PAS) symbol source circuit 112. This circuit receives a sequence of bits 111 and produces a sequence of modulation symbols 113. The produced symbols 113 have probabilistic amplitude shaping. The symbols produced are multi-level symbols which have multiple different amplitudes. The PAS symbol source circuit 112 performs probabilistic selection of the modulation symbols from a modulation symbol alphabet. Constellation points with higher amplitude are selected less frequently than constellation points with lower amplitude. A frequency of occurrence of symbols in the stream of symbols 113 produced by the PAS symbol source circuit 112 is dependent upon a probability-amplitude distribution for symbols of the constellation. The probability-amplitude distribution is or is close to a Gaussian distribution to maximize capacity. The shape of the probability-amplitude distribution causes low-amplitude symbols to occur more frequently on average in the stream 113 than high-amplitude symbols. At high signal to noise ratios, a significant gain can be achieved by this shaping of the probability-amplitude distribution compared to equally probable amplitudes.

The stream of symbols 113 produced by the PAS symbol source circuit 112 is provided to a constellation re-mapper circuit 114. The constellation re-mapper circuit 114 is configured to receive a stream of symbols 113 of a constellation that has an associated first probability-amplitude distribution and produces an output stream of symbols 115 for the same constellation that has an associated second probability-amplitude distribution that is different to the first probability-amplitude distribution. The constellation re-mapper circuit 114 changes the statistics of the probability-amplitude distribution associated with the symbol stream. The constellation re-mapper circuit 114 is configured to lower a kurtosis of the probability-amplitude distribution that determines the frequency of occurrence of symbols in the stream of symbols.

In this example, but not necessarily all examples, the stream of symbols 115 from the constellation re-mapper circuit 114 is channel coded using a forward error correction (FEC) encoder 116. The channel-encoded symbols are then provided to the modulator circuit 118 and are then modulated onto a carrier to produce the modulated carrier signal 101 transmitted through the optical channel 102.

The optical channel 102 can, in some examples, be an optical fiber that travels over a short distance or a long distance. For example it may be used to span a distance of a few meters in a data center or thousands of kilometers in a transatlantic submarine cable.

The receiver 120 is configured to reverse the encoding stages of the transmitter and to recover an estimate 129 of the original bits 111 that were encoded by the transmitter 110.

The modulated carrier signal 101 is received at the receiver 120 and is demodulated by demodulator 122 to recover the encoded modulation symbols. The encoded modulation symbols are then decoded by a channel decoder, for example a FEC decoder 124, to produce estimates of the transmitted modulation symbols (after re-mapping). The inverse re-mapper circuit 126 reverses the mapping applied in the constellation re-mapping circuit 114 and the PAS symbol receiver circuit 128 performs the inverse process performed by the PAS symbol source circuit 112.

The inverse constellation re-mapper circuit 126 is configured, in response to receipt of a stream of symbols of a constellation, to map the stream of symbols to a different stream of symbols of the constellation where the different stream of symbols can have a higher kurtosis than the stream of symbols.

The channel encoder 116 is systematic in that information bits are left unchanged by the encoding. The FEC encoder 116 adds parity bits only. The FEC encoding does not therefore impact on the kurtosis of the probability-amplitude distribution associated with the transmitted symbols. This is true because the parity bits are equiprobable (equal probability for 1 and 0) and they become sign (or quadrant selection) bits for the constellation.

It will therefore be appreciated from the foregoing that FIG. 1 illustrates an apparatus 110 comprising: a probabilistic amplitude shaping symbol source circuit 112 configured, in response to receipt of input data 111, to produce a stream of symbols of a constellation for modulation wherein a frequency of occurrence of symbols in the first stream of symbols 113 is dependent upon a probability-amplitude distribution for symbols of the constellation, wherein the probability-amplitude distribution is a probability-amplitude distribution that causes low-amplitude symbols to occur more frequently on average in the stream than high-amplitude symbols; and a constellation re-mapper circuit configured, in response to receipt of the first stream of symbols 113, to map the first stream of symbols 113 to a second stream of symbols 115 of the constellation for modulation and to produce the second stream of symbols 115, wherein the second stream of symbols 115 has a lower kurtosis than the first stream of symbols 113.

The system 100 is an optical communication system comprising: a transmitter 110 configured to transmit a modulated carrier signal 101 onto which a stream of symbols of the constellation has been modulated and a receiver comprising: demodulation circuitry 122 configured, in response to receipt of the modulated carrier signal 101, to demodulate the modulated carrier signal to obtain a stream 123 of symbols of the constellation and use the probability-amplitude distribution for symbols of the constellation to obtain an estimate 129 of the input data 111. The receiver 120 comprises circuitry 122 configured to perform blind equalization to produce a stream of symbols 123, a FEC decoder 124 to produce estimates of the transmitted modulation symbols 125, an inverse constellation re-mapper circuit 126 configured, in response to receipt of the stream of symbols 125 of the constellation, to map the stream of symbols 125 to a different stream of symbols 127 of the constellation, where the different stream of symbols 127 can have a higher kurtosis than the original stream 125 of symbols. The receiver 120 also comprises circuitry 128 for recovering from the stream of symbols 127 estimated data bits 129, which estimate the input data bits 111.

The channel demodulator 122 performs blind equalization. In blind equalization a transmitted signal is inferred (equalized) from a received signal. In this example, but not necessarily all examples, the demodulator circuit 122 performs blind adaptive signal equalization using a least mean squares (LMS) filter. The LMS filter compensates for time-varying linear distortions in the optical channel 102 and equalizes the channel frequency response. It performs stochastic gradient descent, for example using the constant modulus algorithm (CMA). The constant modulus algorithm uses a second order cost function that includes a cross-correlation of the input signal and the output signal. The inventors have realized that this cross-correlation can be very small if the input signal is derived from symbols that have a probabilistic amplitude shaped constellation. This is particularly problematic when the frequency of occurrence of symbols in the stream is dependent upon a probability amplitude distribution of symbols of the constellation that is or which approximates to a Gaussian distribution.

The PAS signal source circuit 112 can for example use the Gaussian or quasi-Gaussian probability-amplitude distribution for producing the stream of symbols 113. The constellation re-mapper circuit 114 reduces the kurtosis of the probability-amplitude distribution and therefore improves the performance of blind equalization in the channel demodulator 122.

Kurtosis is a measure of the "tailedness" of a probability distribution. The standard measure of kurtosis is the fourth standardized moment. The fourth standardized moment is a normalized version of the fourth moment in which the fourth moment has been divided by a fourth power of the standard deviation which renders the standardized scaling variant. A central moment is a moment of a probability distribution of a variable about the variable's mean. It is the expected value of a specified power of the deviation of the variable from the mean. The fourth central moment uses an specified power of 4. The kurtosis can therefore be defined as $\mu_4/\sigma^4$, where $\mu_4$ is the fourth central moment and $\sigma$ is the standard deviation.

The probabilistic amplitude shaping symbol source circuit 112 is configured, in response to receipt of the input data 111, to produce the first stream of symbols 113 of the constellation for modulation wherein a frequency of occurrence of symbols in the first stream is dependent upon a probability-amplitude distribution P for symbols of the constellation, wherein the probability-amplitude distribution P is a probability-amplitude distribution that causes low-amplitude symbols to occur more frequently on average in the stream than high-amplitude symbols.

The PAS symbol source circuit 112 can be configured to operate in a number of different ways to produce a stream of symbols 113 of the constellation, where a frequency of occurrence of symbols in the stream 113 is dependent upon a probability-amplitude distribution for symbols of the constellation and a shape of the probability-amplitude distribution causes low-amplitude symbols to occur more frequently on average in the stream than high-amplitude symbols.

For example, the PAS symbol source circuit 112 can for example use a shell mapping algorithm or comprise a multi-level distribution matcher or a combination of binary distribution matchers.

There are several algorithms for distribution matching and inverse distribution matching. The algorithm for distribution matching is uniquely reversable, which means that it retrieves the original information sequence from the received one.

For a M-QAM modulation, e.g. 64-QAM, the modulation has an alphabet of size M and a symbol codeword size of N symbol bits where $M=2^N$, $N=\log_2(M)$. The codeword is a sequence of N binary symbol bits.

Figure 2:
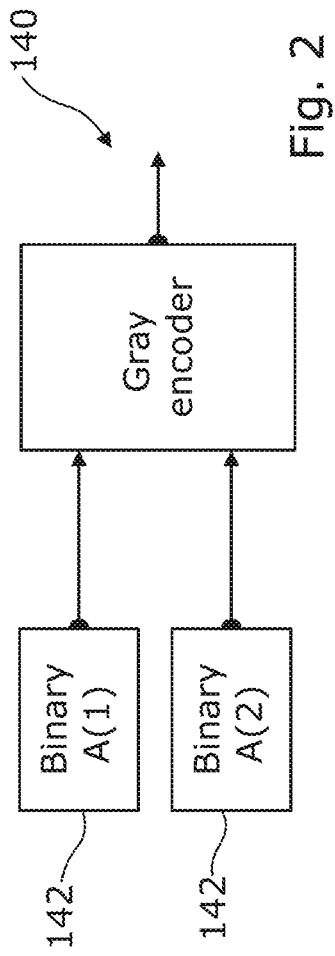
FIG. 2 shows another example embodiment of the subject matter described herein.

In some examples, for example as illustrated in FIG. 2, an amplitude distribution matcher 140 is used to separately define each bit of a symbol that encodes an amplitude of the symbol. Each symbol bit permutation that defines a different amplitude of a symbol has a different probability. An amplitude distribution matcher 140 can, for example, be used to produce a Probabilistically Amplitude Shaped (PAS) symbol with a target Gaussian probability density function.

A sequence of N data bits produces a symbol of size N from an alphabet of size M with the desired probability distribution. The PAS symbol source circuit 112 performs the data bit 111 to symbol 113 mapping.

In some but not necessarily all examples, the PAS symbol source circuit 112 is configured to separate a symbol of N symbol bits into a pair of symbol bits defining a quadrant of the Argand diagram and a sequence of N−2 symbol bits defining a position (X,Y) in the Argand diagram. X is a real component of the symbol and Y is an imaginary component of the symbol.

The N−2 symbols bits comprises N/2−1 symbol bits defining a multi-level amplitude X and N/2−1 symbol bits defining a multi-level amplitude Y. The multi-level amplitude X is an amplitude shift key in the x-direction defined by a code for X of N/2−1 bits. The multi-level amplitude Y is an amplitude shift key in the y-direction, which is orthogonal to the x-direction defined by a code for Y of N/2−1 bits.

An amplitude distribution matcher 140 separately controls a probability distribution Px for the combination of N/2−1 symbol bits defining the multi-level amplitude X, creating a shaped combination of N/2−1 symbol bits defining the multi-level amplitude X. This converts the code for X to a shaped code for X.

The amplitude distribution matcher 140 separately controls a probability distribution Py for the combination of N/2−1 symbol bits defining the multi-level amplitude Y, creating a shaped combination of N/2−1 symbol bits defining the multi-level amplitude Y. This converts the code for Y to a shaped code for Y.

The amplitude distribution matcher 140 illustrated in FIG. 2 uses N/2−1 binary distribution matchers 142. Each binary distribution matcher 142 controls a probability for one of the N/2−1 symbol bits defining the multi-level amplitude (A e.g. X or Y).

For example, a first bit A(1) produced by a first binary distribution matcher 142 will be 1 with probability p1 and 0 with probability (1−p1) and a second bit A(2) produced by a second binary distribution matcher, produces 1 with probability p2, 0 with probability (1−p2).

The first bit A(1) and second bit A(2) define a code A(1) A(2) for the multi-level amplitude A that has been probability amplitude shaped in one dimension.

| A(1) | Probability A(1) | A(2) | Probability A(2) | code for A | Gray coded | Unnormalised amplitude A | Probability of A |
|---|---|---|---|---|---|---|---|
| 0 | 1−p1 | 0 | 1−p2 | 00 | 00 | 1 | (1−p1)(1−p2) |
| 0 | 1−p1 | 1 | p2 | 01 | 01 | 3 | (1−p1)p2 |
| 1 | p1 | 0 | 1−p2 | 10 | 11 | 5 | p1(1−p2) |
| 1 | p1 | 1 | p2 | 11 | 10 | 7 | p1p2 |

It will be appreciated that the above procedure is performed for A=X and A=Y, to produce a shaped code for multi-level amplitude X that has been probability amplitude shaped in a first dimension (x) and a shaped code for multi-level amplitude Y that has been probability amplitude shaped in a second dimension (y).

In the original symbol (of N symbol bits) the code for X of N/2−1 bits is replaced by the shaped code for X of N/2−1 symbol bits and the code for Y of N/2−1 bits is replaced by the shaped code for Y of N/2−1 symbol bits. This produces a shaped symbol of N symbol bits. The 2 quadrant bits are thus combined (unchanged) with the shaped code for X of N/2−1 symbol bits and shaped code for Y of N/2−1 symbol bits to produce a probabilistic amplitude shaped symbol of N symbol bits.

It will therefore be appreciated that the probabilistic amplitude shaping symbol circuit 112 can be configured to separate orthogonal amplitude values (X,Y) from a modulation symbol, to perform probabilistic amplitude shaping independently on each orthogonal amplitude value (X,Y) to create orthogonal probabilistic amplitude shaped amplitude values, and to recombine the orthogonal probabilistic amplitude shaped amplitude values to create a probabilistic amplitude shaped modulation symbol.

The probability-amplitude distribution Px has a shape that causes low-X symbols to occur more frequently on average in a stream than high-X symbols. It may be or may approximate to a Gaussian distribution.

The probability-amplitude distribution Py has a shape that causes low-Y symbols to occur more frequently on average in a stream than high-Y symbols. It may be or may approximate to a Gaussian distribution.

The overall probability-amplitude distribution has a shape that causes low-amplitude symbols to occur more frequently on average in a stream than high-amplitude symbols. It may be or may approximate to a Gaussian distribution.

The PAS symbol source circuit 112 can be implemented using hardware, for example as an application specific circuit.

The PAS symbol source circuit 112 can be implemented without using a running algorithm but instead using a look-up table.

The constellation re-mapper circuit 114 is configured, in response to receipt of a first stream of symbols 113, to map the first stream of symbols 113 to the second stream of symbols 115 of the constellation for modulation. The second stream of symbols 115 has a lower kurtosis than the first stream of symbols 113.

For example, the first stream of symbols 113 has an associated probability amplitude distribution that is quasi-Gaussian whereas the second stream of symbols 115 has modified symbol level statistics with lower kurtosis.

In the present example, but not necessarily all examples, the constellation re-mapper circuit 114 is an $\Delta$-dimensional re-mapper, configured, in response to receipt of the first stream of symbols 113 of a constellation, to map each non-overlapping contiguous group of $\Delta$ symbols of the first stream of symbols 113 to a non-overlapping contiguous group of $\Delta$ symbols of the second stream of symbols 115 of the constellation, wherein $\Delta$ is greater than or equal to 2.

The constellation re-mapper circuit 114 is configured to control statistics of the symbol groups rather than independently setting statistics of each symbol.

The multi-dimensional mapper, maps a group of $\Delta$ input symbols to $\Delta$ output symbols. There are $M^\Delta$ symbol combinations, where M is the symbol alphabet size. The larger $\Delta$, the larger number of available combinations, and the more accurate generation of symbol statistics.

The constellation re-mapper circuit 114 can be implemented using a look-up table (LUT). A LUT is a block of memory locations indexed by an input address, to produce as an output a value stored at the indexed location.

For a multi-dimensional mapper, the LUT has $M^\Delta$ locations, each storing N bits. The N symbol bits of the input symbol 113 identifies a particular constellation M and addresses a particular location in the LUT which returns N symbol bits of the output symbol 115.

The LUT is pre-computed and stored. In some example the LUT is re-programmable. Re-programming can vary the size $M^\Delta$. Alternatively or additionally, re-programming can change the value stored at each of the $M^\Delta$ indexed locations.

The remapping can introduce a correlation between the odd and even symbol generated by the re-mapper. This correlation is an evident proof that re-mapping has been used and can be traced by looking at the statistical properties of the even and odd symbols at the transmitter output.

Kurtosis changes with entropy which is dependent upon information (data) rate. There is therefore a different LUT for each information (data) rate supported.

In some examples, the probabilistic amplitude shaping symbol source circuit 112 and the constellation re-mapper circuit 114 can be combined into a single circuit, for example, an application specific integrated circuit.

In some examples, the probabilistic amplitude shaping symbol source circuit 112, the constellation re-mapper circuit 114 and the channel coder 116 can be combined into a single circuit, for example, an application specific integrated circuit.

In some examples, the probabilistic amplitude shaping symbol source circuit 112, the constellation re-mapper circuit 114 and the modulator 118 (and optionally the channel coder 116) can be combined into a single circuit, for example, an application specific integrated circuit.

The constellation re-mapper circuit 114 is used to reduce the kurtosis of all symbols with the smallest possible penalty in capacity.

Constrained optimization is used to create the mapping used by constellation re-mapper circuit 114. The optimization seeks to maximize capacity while meeting a target level for kurtosis.

A search for the multidimensional map uses an algorithm designed to find the reversible permutation of M^Δ elements which when applied to the input M symbols statistic gives a new M symbols statistic with the target kurtosis and minimum loss of information. The input of concatenated codeword of size N*Δ (alphabet size M^Δ) to the map will produce an output concatenated codeword of size N*Δ.

This problem can be formulated as a global optimization problem in a large discrete search space, which counts $$\binom{M^\Delta}{\Delta}$$

possible combinations of reversible permutations. Several heuristic/metaheuristic algorithms exist to approximate global optimization that can be used for this task; for instance, the gradient descend or genetic algorithms can be used.

In one example, the algorithm starts from an initial M^Δ map and applies a first permutation of k terms, generating randomly a new candidate map. For instance, the new candidate map only differs from the previous map for k=1 terms.

Then the statistics of the symbols generated applying the new candidate map is computed. This includes the computation of the kurtosis and the capacity of the new candidate map after the permutation. Additional (or alternative) figures of merit can be used, such as the constellation energy.

The algorithm calculates using a cost function a single numerical term which represent the 'quality' of the new candidate map. The cost function has as variable input parameters the computed kurtosis of the candidate map and a computed capacity of the candidate map. For example, the cost function could be a weighted combination of a squared difference between actual kurtosis and a target kurtosis and a difference between actual capacity and maximum or target capacity.

If the candidate map improves over the currently preferred candidate map (the quality value of the new candidate map is higher) then the candidate map becomes the currently preferred candidate map otherwise it is rejected.

These steps are repeated until the stopping criteria are satisfied. This occurs when the permuted symbols of the preferred exhibit the target kurtosis and the desired capacity.

To allow faster convergence of the algorithm search for the desired solution, probabilistic techniques can be applied.

In this case, the algorithm randomly selects a solution close to the current one, measures its quality, and then decides to move to it or to stay with the current solution based on either one of two probabilities between which it chooses on the basis of the fact that the new solution is better or worse than the current one.

The map can be found using a computer simulation with a symbolic and numerical language (for instance, MATLAB), which emulate the entire transmission chain, including noise. In this scenario the statistics can be estimated using symbolic mathematical tools.

The method therefore comprises:

performing constrained optimization to create a multiple input symbol to multiple output symbol mapping for symbols of a constellation, wherein the output symbols have a probability-amplitude distribution that maximizes channel capacity while constraining symbol kurtosis below a target value; and encoding a look-up table in the apparatus with the mapping.

The target kurtosis value for 64QAM is lower or equal to 1.8.

The kurtosis target value can, for example, be selected based upon the alphabet of the modulation and selected for improved blind equalization at the receiver. In some examples, the probability-amplitude distribution is kurtosis-constrained having a kurtosis conditioned for blind equalization and a shape of the probability-amplitude distribution causes low-amplitude symbols to occur more frequently on average in the stream than high-amplitude symbols.

It will be appreciated from the foregoing that the apparatus 110 therefore comprises circuitry 112, 114 configured, in response to receipt of input data 111, to transmit a stream of symbols 115 of a constellation to a modulator 118 for modulation onto a carrier wherein a frequency of occurrence of symbols in the stream 115 is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols.

If the rate of the data bits 111 is variable, but the modulation rate is fixed, then different data rate will result in different information rates for the channel.

It is possible to transmit at different information rates (data rates) R (number of information bits per symbol) by changing the probability amplitude distribution P and using the same FEC code rate (c)

$$R = H(P) - (1-c)*m$$

where H(P) is the entropy of P expressed in digital bits and m is number of bits per QAM symbol.

As the data rate R decreases, entropy decreases, and the probability amplitude distribution provided by the PAS symbol source circuit narrows increasing kurtosis. As the data rate R increases, entropy increases, and the probability amplitude distribution provided by the PAS symbol source circuit broadens decreasing kurtosis.

The kurtosis depends on the statistical properties of the PAS symbols 113, such as the signal Entropy H which in turn is a function of the distribution matcher information rate R. In particular, it is expected to increase when the information rate and signal entropy decreases for the same constellation type. Kurtosis is the result of the distribution matcher working at a selected information rate, and thus cannot be changed independently from the information rate, unless with use the constellation re-mapper circuit 114.

Figure 3A:
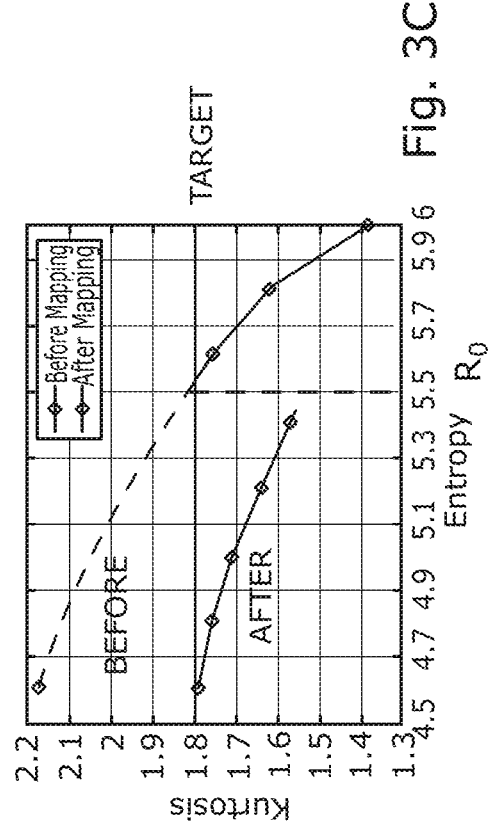
FIG. 3A shows another example embodiment of the subject matter described herein.
Figure 3B:
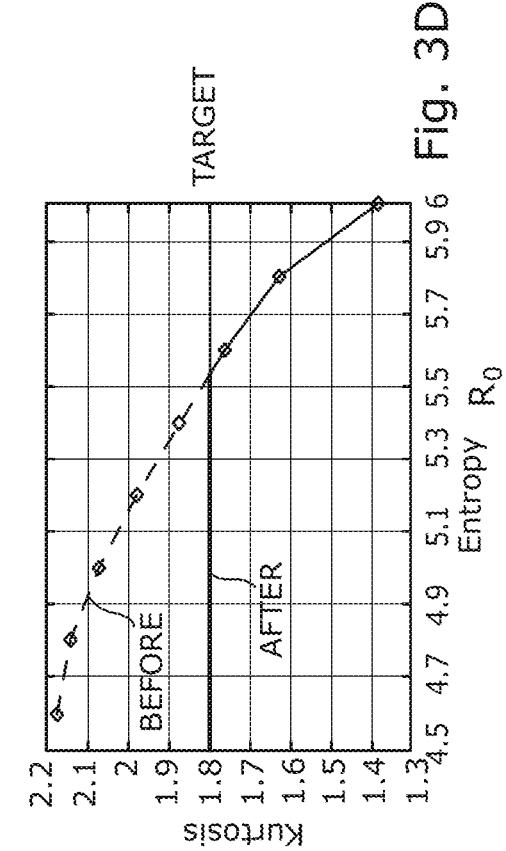
FIG. 3B shows another example embodiment of the subject matter described herein.

In some examples, for example as illustrated in FIGS. 3A & 3B, the apparatus 110 uses the constellation re-mapping circuit 114 irrespective of the data rate.

In one example, for example as illustrated in FIG. 3A, the stream of symbols 115 for transmission has a probability-amplitude distribution that has a kurtosis that is less than that for a probability-amplitude distribution of the symbols output by the PAS symbol source circuit 112 and is less than the target kurtosis value.

In other examples, for example as illustrated in FIG. 3B, the apparatus 110 uses the constellation re-mapping circuit 114 irrespective of the data rate. In this example, the stream of symbols 115 for transmission has a probability-amplitude distribution that has a fixed kurtosis that less than the target kurtosis value for all data rates.

Figure 3C:
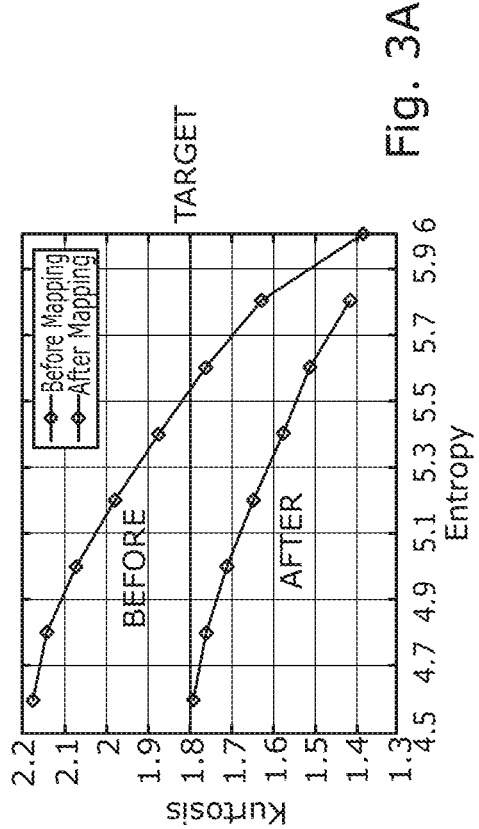
FIG. 3C shows another example embodiment of the subject matter described herein.
Figure 3D:
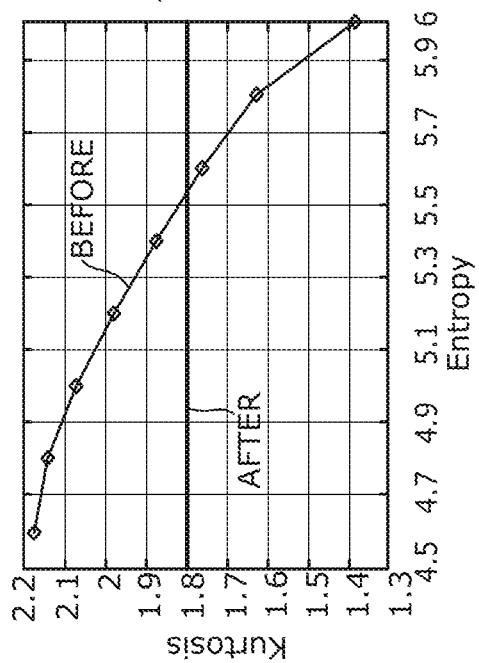
FIG. 3D shows another example embodiment of the subject matter described herein.

In some examples, for example as illustrated in FIGS. 3C & 3D, the apparatus 110 uses the constellation re-mapping circuit 114 only at lower data rates when a probability-amplitude distribution of the symbols output by the PAS symbol source circuit 112 is more than the target kurtosis value.

In one example, for example as illustrated in FIG. 3C, below a first data rate $R_o$, the stream of symbols 115 for transmission has a probability-amplitude distribution that has a kurtosis that is less than that for a probability-amplitude distribution of the symbols output by the PAS symbol source circuit 112 (dotted line) and is less than the target kurtosis value. The kurtosis can for example be at the kurtosis target value at a low data rate and reduce monotonically as the data rate increases towards the first data rate. Above the first data rate remapping is not performed and the stream of symbols 115 for transmission are the symbols output by the PAS symbol source circuit 112 which at these data rates has a probability-amplitude distribution with a kurtosis less than the target kurtosis value. The kurtosis reduces monotonically as the data rate increases beyond the first data rate. Consequently, kurtosis reduces monotonically before the first data rate, is re-set at the first data rate and then continues to reduce monotonically after the first data rate.

In another example, for example as illustrated in FIG. 3D, below a first data rate Ro, the stream of symbols 115 for transmission has a probability-amplitude distribution that has a fixed kurtosis (solid flat line) that is less than that for a probability-amplitude distribution of the symbols output by the PAS symbol source circuit 112 (dotted line) and is less than the target kurtosis value. Above the first data rate remapping is not performed and the stream of symbols 115 for transmission are the symbols output by the PAS symbol source circuit 112 which at these data rates has a probability-amplitude distribution with a kurtosis less than the target kurtosis value. The kurtosis reduces monotonically as the data rate increases beyond the first data rate. Consequently, kurtosis is fixed before the first data rate, is re-set at the first data rate and then continues to reduce monotonically after the first data rate.

The presence of a constant kurtosis with increasing data rate (FIG. 3B, 3D) or a step-wise increase in kurtosis with increasing data rate (FIG. 3C) is a measurable artefact in the optical channel 102.

It will therefore be appreciated that in at least some examples the apparatus 110, comprises circuitry 114 configured, in response to receipt of input data 111 at a first data rate, to transmit a stream of symbols 115 of a constellation to a modulator 118 for modulation onto a carrier wherein a frequency of occurrence of symbols in the stream 115 is dependent upon a first probability-amplitude distribution for symbols of the constellation, wherein the first probability-amplitude distribution has a first kurtosis and a shape of the first probability-amplitude distribution causes low-amplitude symbols to occur more frequently on average in the stream than high-amplitude symbols;

configured, in response to receipt of input data 111 at a second data rate, higher than the first data rate, to transmit a stream of symbols of a constellation to a modulator for modulation onto a carrier wherein a frequency of occurrence of symbols in the stream is dependent upon a second, different probability-amplitude distribution for symbols of the constellation, wherein the second probability-amplitude distribution has a second, different kurtosis that is less than the first kurtosis and a shape of the second probability-amplitude distribution causes low-amplitude symbols to occur more frequently on average in the stream than high-amplitude symbols; and configured, in response to receipt of input data at a third data rate, higher than the second data rate, to transmit a stream of symbols of a constellation to a modulator for modulation onto a carrier wherein a frequency of occurrence of symbols in the stream is dependent upon a third, different probability-amplitude distribution for symbols of the constellation, wherein the third probability-amplitude distribution has a third, different kurtosis that is less than the first kurtosis and greater than the second kurtosis and a shape of the third probability-amplitude distribution causes low-amplitude symbols to occur more frequently on average in the stream than high-amplitude symbols.

The following table specifies an example of a mapping used to convert symbols 113 to symbols 115.

In this example, Δ=2, and M=64 (N=6). There are four amplitude levels, two bits, for X and four amplitude levels, two bits, for Y. Two binary distribution matchers are used for X, one for each bit. Two binary distribution matchers are used for Y, one for each bit. The data rate is R=4. Entropy 5.2 b/s for a code rate c=0.8. In this example, p1=0.1561 & p2=0.4072. The input symbols stats for the codes 00, 01, 11, 10 are 0.25, 0.17, 0.046, 0.031. The kurtosis 1.96.

Remapping using the following table.

| Input symbol combinations | 1, 1 | 1, 3 | 1, 5 | 1, 7 | 3, 1 | 3, 3 | 3, 5 | 3, 7 | 5, 1 | 5, 3 | 5, 5 | 5, 7 | 7, 1 | 7, 3 | 7, 5 | 7, 7 |
|---|---|---|---|---|---|---|---|---|---|---|---|---|---|---|---|---|
| Output symbol combinations | 1, 3 | 3, 1 | 5, 1 | 1, 7 | 1, 1 | 3, 3 | 1, 5 | 7, 3 | 5, 3 | 5, 5 | 7, 1 | 5, 7 | 3, 5 | 3, 7 | 7, 5 | 7, 7 |

The output symbols stats for the codes 00, 01, 11, 10 are 0.22, 0.19, 0.057, 0.025. Kurtosis 1.78

In some examples, the probabilistic amplitude shaping symbol circuit 112 is configured to perform probabilistic amplitude shaping independently for an X amplitude of a symbol (real part of a symbol) and a Y amplitude of a symbol (imaginary part of a symbol).

In some examples, the probabilistic amplitude shaping symbol circuit is configured to perform probabilistic amplitude shaping independently for different polarizations. FIGS. 4A, 4B, 4C, 4D illustrate various examples of transmitter apparatus 110 as previously described.

The transmission chain is as described for FIG. 1, although the channel FEC encoder 116 is absent in these examples. It can be present in other examples.

In these examples, the probabilistic amplitude shaping symbol source circuit 112 is provided by parallel multi-level distribution matchers 140.

In these examples, the constellation re-mapper circuit 114 comprises parallel re-mapper LUTs 150.

Figure 4A:
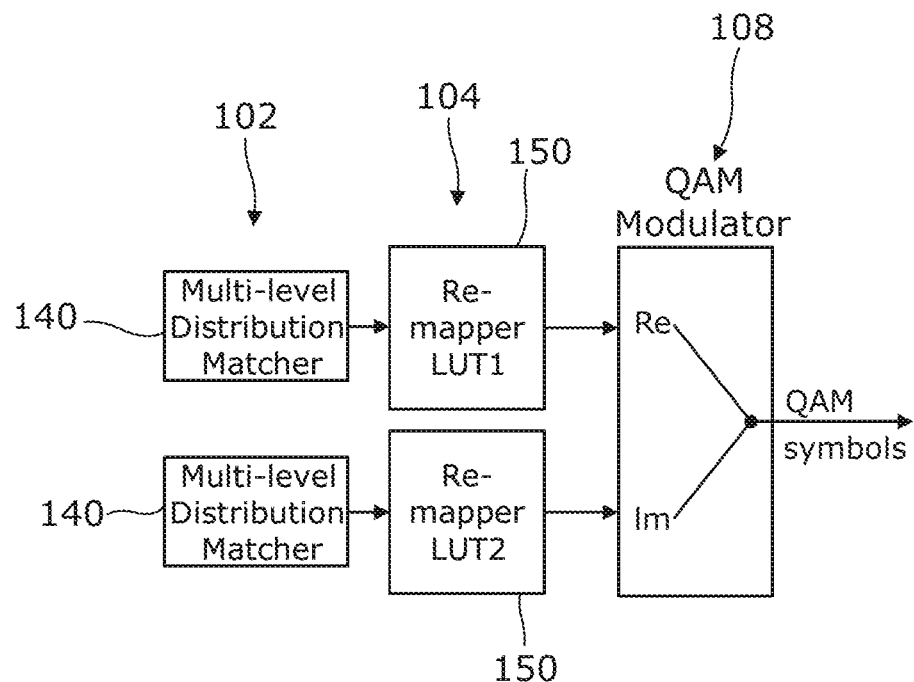
FIG. 4A shows another example embodiment of the subject matter described herein.

In FIG. 4A, the first multi-level distribution matcher 140 and re-mapper LUT 150 produces a stream of symbols that is used to produce real symbols (X amplitudes) of a complex M-QAM symbol. The second multi-level distribution matcher 140 and re-mapper LUT 150 produces a stream of symbols that is used to produce imaginary symbols (Y amplitudes) of the complex M-QAM symbol. The QAM modulator 108 combines the stream of real (X amplitude) symbol bits and the stream of imaginary (Y amplitude) symbol bits (with a stream of quadrant parity bits) to form a stream of M-QAM complex symbols.

Figure 4B:
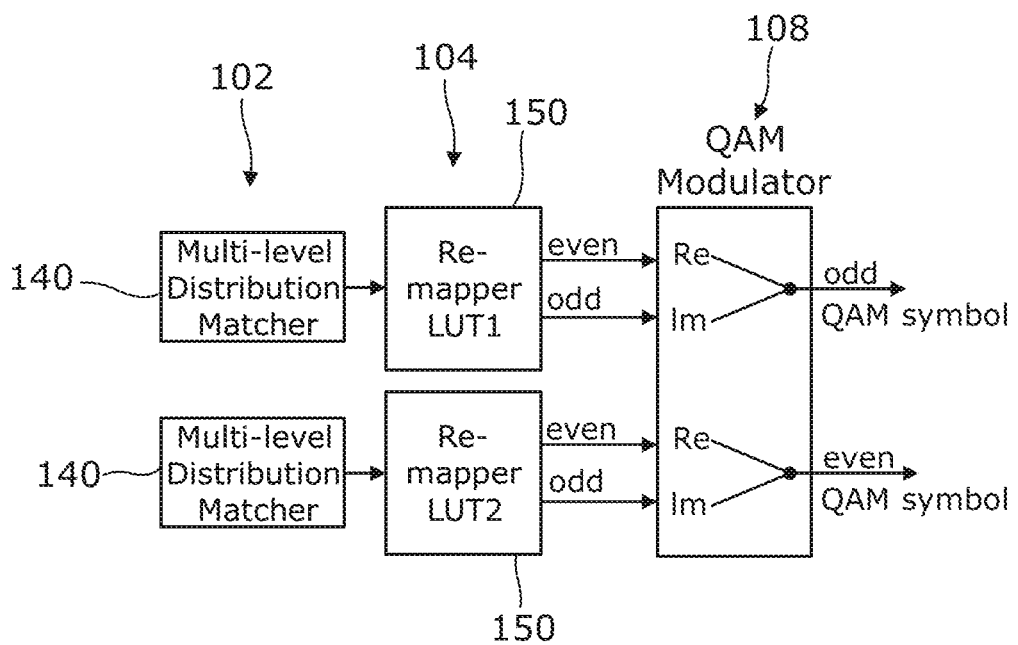
FIG. 4B shows another example embodiment of the subject matter described herein.

In FIG. 4B, the division between the first and second multi-level distribution matchers 140 is not between real and imaginary but is between odd and even.

In FIG. 4B, the first multi-level distribution matcher 140 and re-mapper LUT 150 produces a stream of symbols. The even symbols in the stream of symbols are used to produce real symbols (X amplitudes) of a complex M-QAM symbol. The odd symbols in the stream of symbols are used to produce imaginary symbols (Y amplitudes) of the complex M-QAM symbol. The QAM modulator 108 combines the stream of real (X amplitude) symbol bits and the stream of imaginary (Y amplitude) symbol bits (with a stream of quadrant parity bits) to form odd symbols in a stream of M-QAM complex symbols.

The second multi-level distribution matcher 140 and re-mapper LUT 150 produces a stream of symbols. The even symbols in the stream of symbols are used to produce real symbols (X amplitudes) of a complex M-QAM symbol. The odd symbols in the stream of symbols are used to produce imaginary symbols (Y amplitudes) of the complex M-QAM symbol. The QAM modulator 108 combines the stream of real (X amplitude) symbol bits and the stream of imaginary (Y amplitude) symbol bits (with a stream of quadrant parity bits) to form even symbols in the stream of M-QAM complex symbols.

Figure 4C:
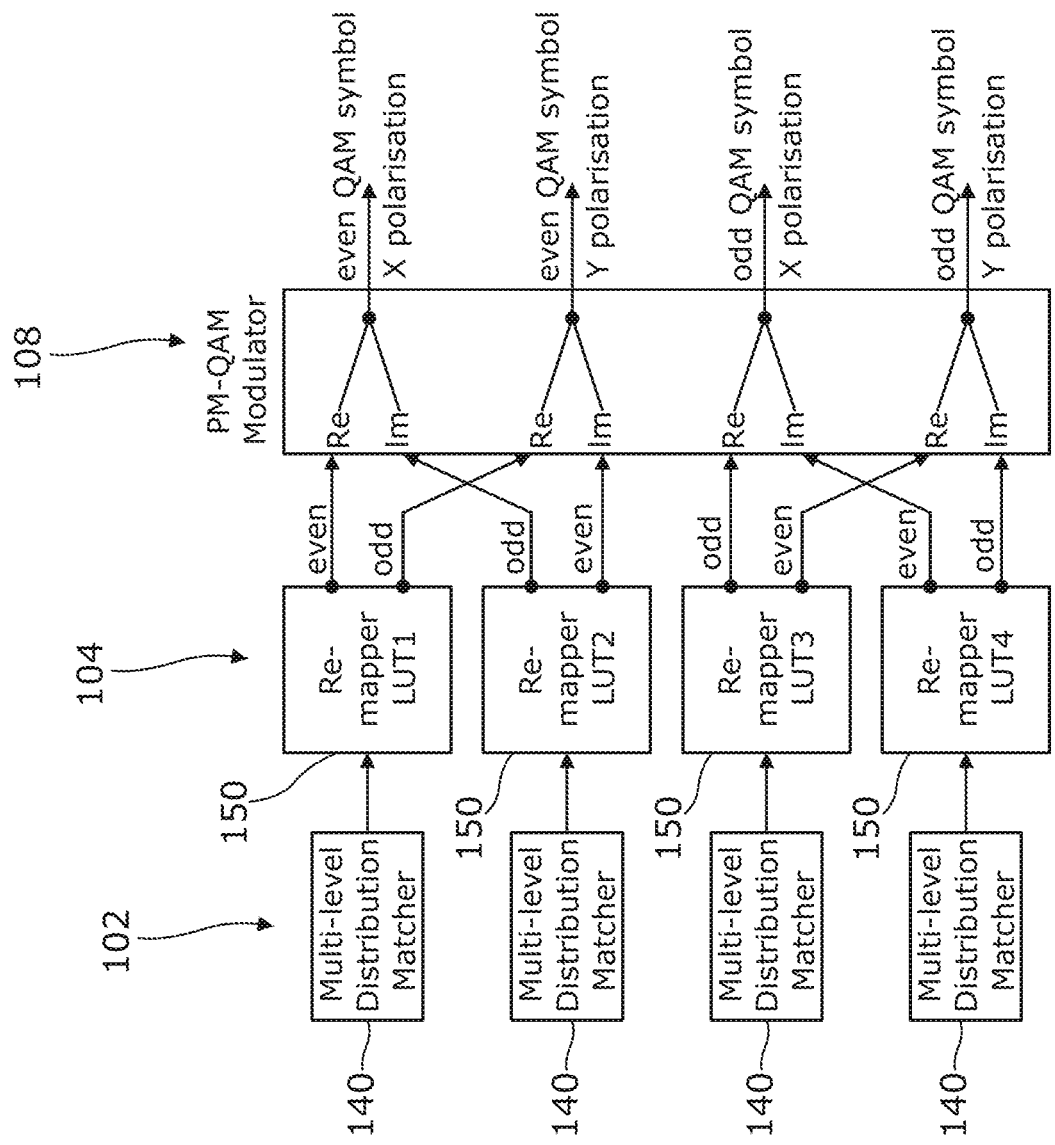
FIG. 4C shows another example embodiment of the subject matter described herein.

In FIG. 4C, the first multi-level distribution matcher 140 and re-mapper LUT 150 produces a stream of symbols. The even symbols in the stream of symbols are used to produce even real symbols (X amplitudes) of an even complex M-QAM symbol for a first polarization. The odd symbols in the stream of symbols are used to produce even real symbols (X amplitudes) of an even complex M-QAM symbol for a second polarization.

The second multi-level distribution matcher 140 and re-mapper LUT 150 produces a stream of symbols. The even symbols in the stream of symbols are used to produce even imaginary symbols (Y amplitudes) of the complex M-QAM symbol for the second polarization. The odd symbols in the stream of symbols are used to produce even imaginary symbols (Y amplitudes) of the even complex M-QAM symbol for the first polarization.

A third multi-level distribution matcher 140 and re-mapper LUT 150 produces a stream of symbols. The even symbols in the stream of symbols are used to produce odd real symbols (X amplitudes) of a complex M-QAM symbol for the second polarization. The odd symbols in the stream of symbols are used to produce odd real symbols (X amplitudes) of a complex M-QAM symbol for the first polarization.

A fourth multi-level distribution matcher 140 and re-mapper LUT 150 produces a stream of symbols. The even symbols in the stream of symbols are used to produce odd imaginary symbols (Y amplitudes) of the complex M-QAM symbol for the first polarization. The odd symbols in the stream of symbols are used to produce odd imaginary symbols (Y amplitudes) of the complex M-QAM symbol for the second polarization.

Figure 4D:
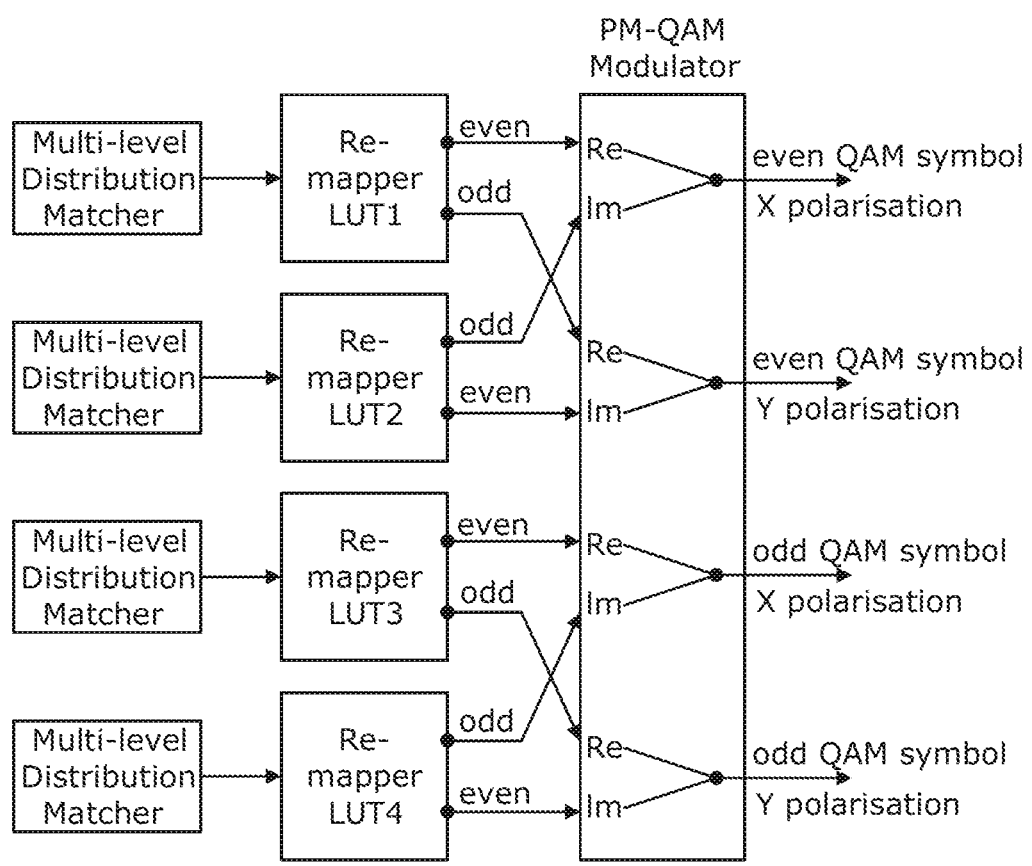
FIG. 4D shows another example embodiment of the subject matter described herein.

The QAM modulator 108 combines the odd and even complex symbols as a stream. FIG. 4D is similar to FIG. 4C except that, for the third multi-level distribution matcher 140 and re-mapper LUT 150, the even symbols in the stream of symbols are used to produce odd real symbols (X amplitudes) of the complex M-QAM symbol for the first polarization (not the second polarization) and the odd symbols in the stream of symbols are used to produce odd real symbols (X amplitudes) of the complex M-QAM symbol for the second polarization (not the first polarization).

A fourth multi-level distribution matcher 140 and re-mapper LUT 150 produces a stream of symbols. The even symbols in the stream of symbols are used to produce odd imaginary symbols (Y amplitudes) of the odd complex M-QAM symbol for the second polarization (not the first polarization). The odd symbols in the stream of symbols are used to produce odd imaginary symbols (Y amplitudes) of the complex M-QAM symbol for the first polarization (not the second polarization).

Referring to FIGS. 4A and 4B, each re-mapper 150 produces an odd stream of symbols and even stream of symbols. There are therefore four sources of symbols that can be used, in any order, for real symbols of an odd stream of complex M-QAM symbols, imaginary symbols of an odd stream of complex M-QAM symbols, real symbols of an even stream of complex M-QAM symbols, and imaginary symbols of an even stream of complex M-QAM symbols.

Referring to FIGS. 4C and 4D, each re-mapper 150 produces an odd stream of symbols and an even stream of symbols. There are therefore eight sources of symbols that can be used, in any order, for:

real symbols of an odd stream of complex M-QAM symbols, imaginary symbols of an odd stream of complex M-QAM symbols, real symbols of an even stream of complex M-QAM symbols, and imaginary symbols of an even stream of complex M-QAM symbols (for the first polarization and the second polarization).

Figure 5:
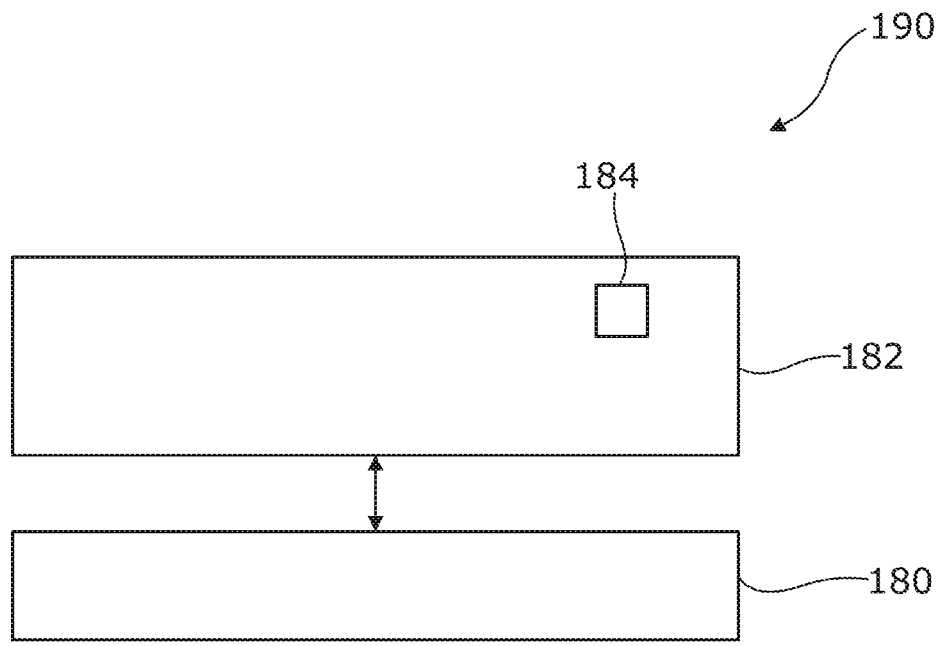
FIG. 5 shows another example embodiment of the subject matter described herein.

FIG. 5 illustrates an example of a controller 190. Implementation of a controller 190 may be as controller circuitry. The controller 190 may be implemented in hardware alone, have certain aspects in software including firmware alone or can be a combination of hardware and software (including firmware).

As illustrated in FIG. 5 the controller 190 may be implemented using hardware encoded or software encoded instructions that enable hardware functionality, for example, by using executable instructions of a computer program 184 in a general-purpose or special-purpose processor 180 that may be stored on a computer readable storage medium (disk, memory etc) to be executed by such a processor 180.

The processor 180 is configured to read from and write to the memory 182. The processor 180 may also comprise an output interface via which data and/or commands are output by the processor 180 and an input interface via which data and/or commands are input to the processor 180.

The apparatus 110 therefore comprises:
at least one processor 180; and
at least one memory 182
the at least one memory 182 configured to, with the at least one processor 180, cause the apparatus 110 at least to perform:
in response to receipt of input data, to cause transmission of a stream of symbols of a constellation to a modulator for modulation onto a carrier wherein
a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols.

Figure 6:
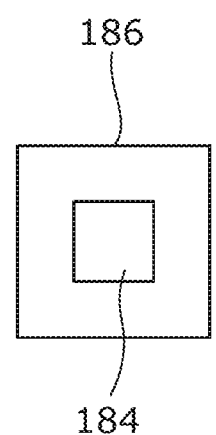
FIG. 6 shows another example embodiment of the subject matter described herein.

As illustrated in FIG. 6, the computer program 184 may arrive at the apparatus 110 via any suitable delivery mechanism 186. The delivery mechanism 186 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 184. The delivery mechanism may be a signal configured to reliably transfer the computer program 184. The apparatus 110 may propagate or transmit the computer program 184 as a computer data signal.

Computer program instructions for causing an apparatus to perform at least the following or for performing at least the following: in response to receipt of input data, to cause transmission of a stream of symbols of a constellation to a modulator for modulation onto a carrier wherein a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols.

The computer program instructions may be comprised in a computer program, a non-transitory computer readable medium, a computer program product, a machine readable medium. In some but not necessarily all examples, the computer program instructions may be distributed over more than one computer program.

Although the memory 182 is illustrated as a single component/circuitry it may be implemented as one or more separate components/circuitry some or all of which may be integrated/removable and/or may provide permanent/semi-permanent/dynamic/cached storage.

Although the processor 180 is illustrated as a single component/circuitry it may be implemented as one or more separate components/circuitry some or all of which may be integrated/removable.

References to 'computer-readable storage medium', 'computer program product', 'tangibly embodied computer program' etc. or a 'controller', 'computer', 'processor' etc. should be understood to encompass specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following hardware circuitry:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s)/controllers or a portion of a microprocessor(s)/controller(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit and its accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1. 2, 3A-3D may represent steps in a method and/or sections of code in the computer program 184. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   circuitry configured, in response to receipt of input data, to transmit a stream of symbols of a constellation to a modulator for modulation onto a carrier, wherein a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols; and
   wherein the target value is a programmable target value.

2. The apparatus as claimed in claim 1, wherein, for increasing data rates for the input data, the transmitted stream of symbols of the constellation has a probability-amplitude distribution with a constant or increasing kurtosis.

3. The apparatus as claimed in claim 1, wherein the target value for 64QAM is 1.8.

4. The apparatus as claimed in claim 1, wherein the probability-amplitude distribution is kurtosis-constrained having a kurtosis conditioned for blind equalization.

5. The apparatus as claimed in claim 1, wherein the circuitry comprises:
   a probabilistic amplitude shaping symbol source circuit configured, in response to receipt of the input data, to produce the first stream of symbols of the constellation for modulation wherein a frequency of occurrence of symbols in the first stream is dependent upon a probability-amplitude distribution for symbols of the constellation, wherein the probability-amplitude distribution is a probability-amplitude distribution that causes low-amplitude symbols to occur more frequently on average in the first stream than high-amplitude symbols; and
   a constellation re-mapper circuit configured, in response to receipt of the first stream of symbols, to map the first stream of symbols to a second stream of symbols of the constellation for modulation and to produce the second stream of symbols wherein the second stream of symbols has a lower kurtosis than the first stream of symbols.

6. The apparatus as claimed in claim 1 embodied in one or more application specific circuits.

7. An optical communication system comprising:
   a transmitter comprising an apparatus comprising circuitry configured, in response to receipt of input data, to transmit a stream of symbols of a constellation to a modulator for modulation onto a carrier, wherein a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols, wherein the transmitter is configured to transmit the carrier onto which the stream of symbols of the constellation has been modulated; and
   a receiver comprising a circuitry configured, in response to receipt of the carrier, to demodulate the carrier to obtain the stream of symbols of the constellation and use the probability-amplitude distribution for symbols of the constellation to obtain an estimate of the input data, wherein the receiver comprises a circuitry for performing blind equalization to produce a stream of signals and an inverse constellation re-mapper configured, in response to receipt of the stream of symbols of a constellation, to map the stream of symbols to a different stream of symbols of the constellation wherein the different stream of symbols has a higher kurtosis than the stream of symbols.

8. A method comprising:
   causing probabilistic amplitude shaping by mapping an input data stream to a first stream of symbols of a constellation such that the first stream has symbols of lower energy that are more probable than other symbols; and
   re-mapping the first stream of symbols to produce a second stream of symbols of the same constellation such that the second stream has a probability distribution of the symbols that is of lower kurtosis than a probability distribution of the first stream.

9. An apparatus, comprising:
a digital mapper to cause probabilistic amplitude shaping by mapping an input data stream to a first stream of symbols of a constellation such that the first stream has symbols of lower energy more probable than other symbols in response to the input data stream being random or pseudorandom; and
a digital re-mapper to map the first stream of symbols into a second stream of symbols of the same constellation such that the second stream has a probability distribution of the symbols of lower kurtosis than the first stream in response to the input data stream being random or pseudorandom.

10. The apparatus as claimed in claim 9, wherein, for increasing data rates for the input data, the transmitted stream of symbols of the constellation has a probability-amplitude distribution with a constant kurtosis.

11. An apparatus, comprising:
circuitry configured, in response to receipt of input data, to transmit a stream of symbols of a constellation to a modulator for modulation onto a carrier, wherein a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols; and
wherein, for increasing data rates for the input data, the transmitted stream of symbols of the constellation has a probability-amplitude distribution with a constant or increasing kurtosis.

12. An apparatus, comprising:
circuitry configured, in response to receipt of input data, to transmit a stream of symbols of a constellation to a modulator for modulation onto a carrier, wherein a frequency of occurrence of symbols in the stream is dependent upon a probability-amplitude distribution for symbols of the constellation, wherein the probability-amplitude distribution has a kurtosis less than a target value and a shape of the probability-amplitude distribution causes low-amplitude symbols to occur more frequently on average in the stream than high-amplitude symbols; and
wherein the circuitry comprises:
a probabilistic amplitude shaping symbol source circuit configured, in response to receipt of the input data, to produce the first stream of symbols of the constellation for modulation wherein a frequency of occurrence of symbols in the first stream is dependent upon a probability-amplitude distribution for symbols of the constellation, wherein the probability-amplitude distribution is a probability-amplitude distribution that causes low-amplitude symbols to occur more frequently on average in the first stream than high-amplitude symbols; and
a constellation re-mapper circuit configured, in response to receipt of the first stream of symbols, to map the first stream of symbols to a second stream of symbols of the constellation for modulation and to produce the second stream of symbols wherein the second stream of symbols has a lower kurtosis than the first stream of symbols.

13. The apparatus as claimed in claim 12, wherein the constellation re-mapper circuit is configured, in response to receipt of the first stream of symbols, to map each non-overlapping group of N symbols of the first stream of symbols to a non-overlapping group of N symbols of the second stream of symbols of the constellation for modulation, wherein N is greater than or equal to 2.

14. The apparatus as claimed in claim 12, wherein the constellation re-mapper circuit comprises at least one look-up table to map the first stream of symbols to the second stream of symbols of the constellation for modulation.

15. The apparatus as claimed in claim 12, wherein the probabilistic amplitude shaping symbol source circuit is configured to separately define each bit of a symbol, for the first stream of symbols, that encodes an amplitude of the symbol, each binary bit permutation having a different probability.

16. The apparatus as claimed in claim 12, wherein the probabilistic amplitude shaping symbol circuit is configured to perform probabilistic amplitude shaping independently for different polarizations or for different real and imaginary symbols or for different odd and even symbols.

* * * * *